US012810629B2

(12) United States Patent
Yamauchi et al.

(10) Patent No.: US 12,810,629 B2
(45) Date of Patent: Nov. 24, 2026

(54) DROWSINESS SIGN NOTIFICATION DEVICE AND METHOD FOR NOTIFICATION OF SIGN OF DROWSINESS

(71) Applicants: TOYOTA JIDOSHA KABUSHIKI KAISHA, Toyota (JP); DENSO CORPORATION, Kariya-city (JP); AISIN CORPORATION, Kariya (JP)

(72) Inventors: Koichiro Yamauchi, Meguro-ku (JP); Takuya Sakata, Minato-ku (JP); Kimimasa Tamura, Ota-ku (JP)

(73) Assignees: TOYOTA JIDOSHA KABUSHIKI KAISHA, Toyota (JP); DENSO CORPORATION, Kariya-city (JP); AISIN CORPORATION, Kariya (JP)

( * ) Notice: Subject to any disclaimer, the term of this patent is extended or adjusted under 35 U.S.C. 154(b) by 223 days.

(21) Appl. No.: 18/775,426

(22) Filed: Jul. 17, 2024

(65) Prior Publication Data

US 2025/0029404 A1 Jan. 23, 2025

(30) Foreign Application Priority Data

Jul. 20, 2023 (JP) ................................ 2023-118191

(51) Int. Cl.
*G06V 20/59* (2022.01)
*G06V 40/18* (2022.01)
*B60W 50/14* (2020.01)

(52) U.S. Cl.
CPC ............ *G06V 20/597* (2022.01); *G06V 40/18* (2022.01); *B60W 50/14* (2013.01); *B60W 2540/229* (2020.02)

(58) Field of Classification Search
CPC ..... G06V 20/597; G06V 40/18; B60W 50/14; B60W 2540/229; B60W 40/08; B60W 2040/0827; B60W 2050/143; G08B 21/06
See application file for complete search history.

(56) References Cited

U.S. PATENT DOCUMENTS 5,786,765 A * 7/1998 Kumakura ............. G08B 21/06 340/576
5,878,156 A * 3/1999 Okumura ............... G08B 21/06 340/576

(Continued)

FOREIGN PATENT DOCUMENTS

JP 2008-181327 A 8/2008
JP 2011167398 A * 9/2011

OTHER PUBLICATIONS

Quentin et al., "Multi-Timescale Drowsiness Characterization Based on a Video of a Driver's Face", Published: Aug. 25, 2018. (Year: 2018).*

*Primary Examiner* — Mekonen T Bekele
(74) *Attorney, Agent, or Firm* — Dinsmore & Shohl LLP

(57) ABSTRACT

A drowsiness sign notification device detects an eye-closed state of a driver of a vehicle from each of face images; determines whether a first eye closure ratio of the number of face images with the eye-closed state to the number of the face images generated in a first period exceeds a first threshold; determines whether a second eye closure ratio of the number of face images with the eye-closed state to the number of the face images generated in a second period longer than the first period exceeds a second threshold less than or equal to the first threshold after determination that the first eye closure ratio does not exceed the first threshold; and notifies detection of a sign of drowsiness to the driver, when the first eye closure ratio exceeds the first threshold or that the second eye closure ratio exceeds the second threshold.

6 Claims, 4 Drawing Sheets

(56) References Cited

U.S. PATENT DOCUMENTS

| | | | | |
|---|---|---|---|---|
| 2004/0090334 | A1* | 5/2004 | Zhang | G08B 21/06 340/575 |
| 2010/0214087 | A1 | 8/2010 | Nakagoshi et al. | |
| 2021/0042497 | A1* | 2/2021 | Sun | G06T 7/20 |

* cited by examiner

DROWSINESS SIGN NOTIFICATION DEVICE AND METHOD FOR NOTIFICATION OF SIGN OF DROWSINESS

CROSS-REFERENCE TO RELATED APPLICATIONS

This application claims priority to Japanese Patent Application No. 2023-118191 filed Jul. 20, 2023, the entire contents of which are herein incorporated by reference.

FIELD

The present disclosure relates to a drowsiness sign notification device configured to notify detection of a sign of drowsiness to a vehicle driver and a method for notification of a sign of drowsiness.

BACKGROUND

When a vehicle driver exhibits a sign of drowsiness, such as eye closure, the risk of a traffic accident is high. Japanese Unexamined Patent Publication No. 2008-181327 describes an anti-dozing device that monitors the state of a driver's eyes and that gives a warning, based on the length of an eye closure time when the eyes are closed.

SUMMARY

Percent of eyelid closure (PERCLOS), which is the ratio of an eye closure time to a unit time and is an index to detect a sign of drowsiness, is known to have a predetermined correlation with a scarcely waking state (a stage before dozing).

When a sign of drowsiness of a vehicle driver is determined based on PERCLOS, a change in the driver's posture or the amount of extraneous light entering the vehicle interior may result in failure of determination whether eyes are opened or closed based on face images of the driver.

In calculating PERCLOS, time when whether eyes are opened or closed cannot be determined is not treated as an eye closure time. For this reason, if time when whether eyes are opened or closed cannot be determined comes after PERCLOS temporarily exceeds a predetermined threshold and notification to a driver is started, the value of PERCLOS temporarily decreases even if the actual state during this time is an eye-closed state. This interrupts notification to the driver even during a scarcely waking state, and results in failure to notify a sign of drowsiness to the driver appropriately.

It is an object of the present disclosure to provide a drowsiness sign notification device that can notify a sign of drowsiness to a driver of a vehicle appropriately.

The following is a summary of the present disclosure.

(1) A drowsiness sign notification device including a processor configured to:

detect an eye-closed state of a driver of a vehicle from each of face images representing a face region of the driver and generated at different times;

determine whether a first eye closure ratio that is the ratio of the number of face images from which the eye-closed state is detected to the number of the face images generated in a first period exceeds a first threshold;

determine whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notify detection of a sign of drowsiness to the driver via notification equipment provided in the vehicle, when it is determined that the first eye closure ratio exceeds the first threshold or that the second eye closure ratio exceeds the second threshold.

(2) The drowsiness sign notification device according to aspect (1), wherein in determination whether the second eye closure ratio exceeds the second threshold, the processor sets the second period longer when the level of autonomous driving executed by a travel controller provided in the vehicle to control travel of the vehicle does not require the driver to be alert to the surroundings of the vehicle than when the level of the autonomous driving requires the driver to be alert to the surroundings of the vehicle.

(3) The drowsiness sign notification device according to aspects (1) or (2), wherein in determination whether the second eye closure ratio exceeds the second threshold, the processor sets the second period longer when the amount of extraneous light entering an interior of the vehicle from outside the vehicle sensed by a light intensity sensor provided in the vehicle exceeds an extraneous light intensity threshold than when the amount of the extraneous light does not exceed the extraneous light intensity threshold.

(4) The drowsiness sign notification device according to any one of aspects (1) to (3), wherein the processor sets the second threshold less than the first threshold in determination whether the second eye closure ratio exceeds the second threshold.

(5) The drowsiness sign notification device according to aspect (4), wherein in determination whether the second eye closure ratio exceeds the second threshold, the processor sets the second threshold lower when the level of autonomous driving executed by a travel controller provided in the vehicle to control travel of the vehicle does not require the driver to be alert to the surroundings of the vehicle than when the level of the autonomous driving requires the driver to be alert to the surroundings of the vehicle.

(6) A method for notification of a sign of drowsiness executed by a drowsiness sign notification device configured to notify detection of a sign of drowsiness to a driver of a vehicle, the method including:

detecting an eye-closed state of the driver from each of face images representing a face region of the driver and generated at different times;

determining whether a first eye closure ratio that is the ratio of the number of face images from which the eye-closed state is detected to the number of the face images generated in a first period exceeds a first threshold;

determining whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notifying detection of a sign of drowsiness to the driver via notification equipment provided in the vehicle, when it is determined that the first eye closure ratio exceeds the first threshold or that the second eye closure ratio exceeds the second threshold.

(7) A non-transitory computer-readable medium storing a computer program for notification of a sign of drowsiness, the computer program causing a computer to execute a process including:

detecting an eye-closed state of a driver of a vehicle from each of face images representing a face region of the driver and generated at different times;

determining whether a first eye closure ratio that is the ratio of the number of face images from which the eye-closed state is detected to the number of the face images generated in a first period exceeds a first threshold;

determining whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notifying detection of a sign of drowsiness to the driver via notification equipment provided in the vehicle, when it is determined that the first eye closure ratio exceeds the first threshold or that the second eye closure ratio exceeds the second threshold.

The drowsiness sign notification device according to the present disclosure can notify a sign of drowsiness to a driver of a vehicle appropriately.

DESCRIPTION OF EMBODIMENTS

A drowsiness sign notification device that can notify a sign of drowsiness to a driver of a vehicle appropriately will now be described in detail with reference to the attached drawings. The drowsiness sign notification device detects an eye-closed state of a driver of a vehicle from each of face images representing a face region of the driver and generated at different times. First, the drowsiness sign notification device determines whether a first eye closure ratio that is the ratio of the number of face images from which the eye-closed state is detected to the number of the face images generated in a first period exceeds a first threshold. After determination that the first eye closure ratio does not exceed the first threshold, the drowsiness sign notification device determines whether a second eye closure ratio that is the ratio of the number of face images from which the eye-closed state is detected to the number of the face images generated in a second period longer than the first period exceeds a second threshold less than or equal to the first threshold. When it is determined that the first eye closure ratio exceeds the first threshold or that the second eye closure ratio exceeds the second threshold, the drowsiness sign notification device gives notification of detection of a sign of drowsiness via notification equipment provided in the vehicle.

Figure 1:
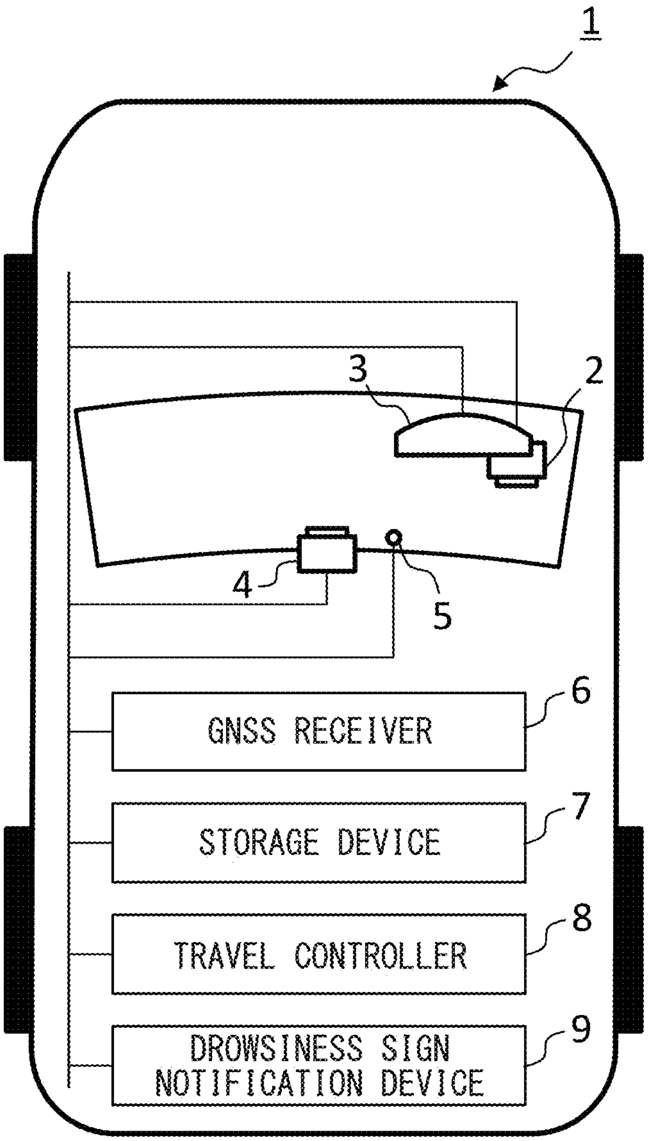
FIG. 1 schematically illustrates the configuration of a vehicle equipped with a drowsiness sign notification device.

FIG. 1 schematically illustrates the configuration of a vehicle equipped with a drowsiness sign notification device.

The vehicle 1 includes a driver monitoring camera 2, a meter display 3, a surroundings camera 4, an optical sensor 5, a global navigation satellite system (GNSS) receiver 6, a storage device 7, a travel controller 8, and a drowsiness sign notification device 9.

The driver monitoring camera 2, the meter display 3, the surroundings camera 4, the optical sensor 5, the GNSS receiver 6, and the storage device 7 are communicably connected to the travel controller 8 and the drowsiness sign notification device 9 via an in-vehicle network conforming to a standard such as a controller area network. The travel controller 8 is communicably connected to the drowsiness sign notification device 9 via the in-vehicle network.

The driver monitoring camera 2 is an example of a sensor for generating time-series face images representing a face region of a driver of the vehicle. The driver monitoring camera 2 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 2 is mounted, for example, in a front area in the vehicle interior and oriented toward the face of the driver sitting on the driver's seat. The driver monitoring camera 2 irradiates the driver with infrared light at predetermined intervals (e.g., intervals of 1/30 to 1/10 seconds), and generates face images representing the driver's face at predetermined intervals.

The meter display 3, which is an example of the notification equipment, includes, for example, a liquid crystal display. The meter display 3 displays a screen for notifying detection of a sign of drowsiness to the driver according to a signal received from the drowsiness sign notification device 9 via the in-vehicle network. As the notification equipment, the vehicle 1 may include a speaker (not illustrated) that outputs a voice for notifying detection of a sign of drowsiness to the driver.

The surroundings camera 4 is an example of a surroundings sensor for generating surroundings data representing the surroundings of the vehicle 1. The surroundings camera 4 includes a two-dimensional detector constructed from an array of optoelectronic transducers, such as CCD or C-MOS, having sensitivity to visible light and a focusing optical system that forms an image of a target region on the two-dimensional detector. The surroundings camera 4 is disposed, for example, in a front upper area in the vehicle interior and oriented forward. The surroundings camera 4 takes a picture of the surroundings of the vehicle 1 through a windshield every predetermined capturing period (e.g., 1/30 to 1/10 seconds), and outputs surroundings images representing the surroundings as surroundings data. As a surroundings sensor, the vehicle 1 may include a sensor other than the surroundings camera 4, e.g., a light detection and ranging (LiDAR) sensor that generates a range image whose pixels each have a value depending on the distance to an object represented in the pixel, as surroundings data, based on the surroundings of the vehicle 1.

The optical sensor 5 is an example of the light intensity sensor that senses the amount of extraneous light. The optical sensor 5 includes a photodetector including a photodiode, and outputs a light intensity signal indicating the amount of received extraneous light. The optical sensor 5 is disposed in the vehicle interior (e.g., in a front upper area in the vehicle interior) so that light outside the vehicle interior enters the photodetector through the windshield.

The GNSS receiver 6, which is an example of a position determining sensor, receives GNSS signals from GNSS satellites every predetermined period, and determines the position of the vehicle 1, based on the received GNSS signals. The GNSS receiver 6 outputs a positioning signal indicating the result of determination of the position of the vehicle 1 based on the GNSS signals to the travel controller 8 via the in-vehicle network every predetermined period.

The storage device 7, which is an example of a storage unit, includes, for example, a hard disk drive or a nonvolatile semiconductor memory. The storage device 7 stores a high-precision map, which includes, for example, information representing lane lines dividing lanes in a predetermined region represented in the high-precision map.

The travel controller 8, which is an example of an autonomous driving system, is an electronic control unit (ECU) including a communication interface, a memory, and a processor. The travel controller 8 reads out information on lane lines around the position of the vehicle indicated by a positioning signal received from the GNSS receiver 6, from the storage device 7, which stores a high-precision map. The travel controller 8 detects lane lines around the vehicle by inputting a surroundings image received from the surroundings camera 4 into a classifier, and matches them to lane lines in the high-precision map to identify a lane being traveled by the vehicle 1. The travel controller 8 generates a trajectory so as to keep the lane or change lanes, depending on the circumstances, and outputs a control signal to a travel mechanism (not illustrated) of the vehicle 1 so as to travel along the trajectory. The travel mechanism includes, for example, an engine or a motor for powering the vehicle 1, brakes for decelerating the vehicle 1, and a steering mechanism for steering the vehicle 1.

The classifier may be, for example, a convolutional neural network (CNN) including convolution layers connected in series from the input side toward the output side, such as You Only Look Once (YOLO) or Single Shot MultiBox Detector (SSD). A CNN that has been trained using a large number of inputted images representing lane lines to be detected as training data operates as a classifier that detects lane lines and that outputs regions representing the lane lines in an image.

When predetermined conditions, e.g., conditions that a detailed map of a location being traveled is accessible and that the driver can drive in case of emergency, are satisfied, the travel controller 8 can control travel of the vehicle 1 at a level of autonomous driving that does not require the driver to be alert to the surroundings of the vehicle, e.g., level 3 of autonomous driving defined by the Society of Automotive Engineers (SAE). When such a condition is not satisfied, the travel controller 8 controls travel of the vehicle 1 at a level of autonomous driving that requires the driver to be alert to the surroundings of the vehicle, e.g., level 2 of autonomous driving defined by SAE. The vehicle 1 may be driven by manual operation in which control signals are outputted to the travel mechanism, based on the driver's operation.

Figure 2:
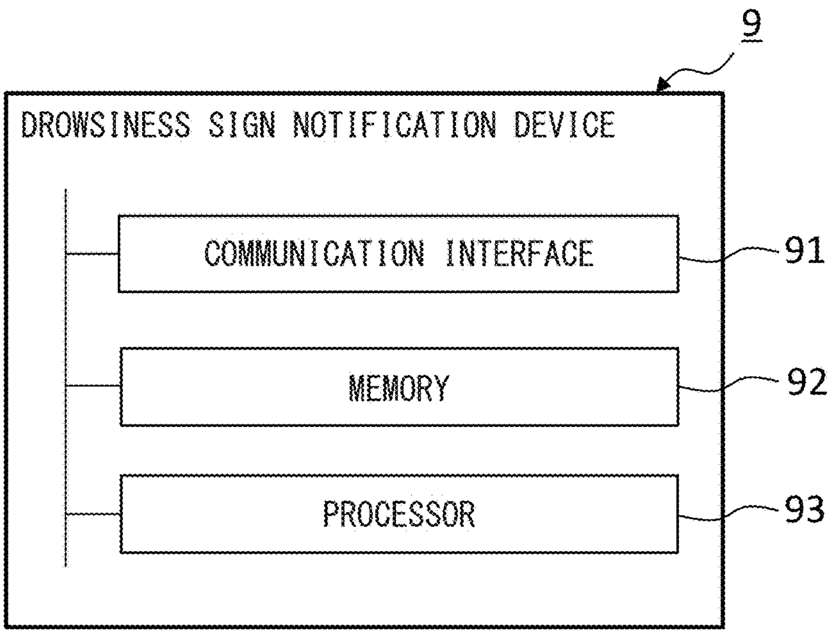
FIG. 2 schematically illustrates the hardware of the drowsiness sign notification device.

FIG. 2 schematically illustrates the hardware of the drowsiness sign notification device 9. The drowsiness sign notification device 9 is an ECU including a communication interface 91, a memory 92, and a processor 93. The drowsiness sign notification device 9 detects the driver's eye-closed state from face images generated by the driver monitor camera 2, and displays an image indicating detection of a sign of drowsiness on the meter display 3 upon detection of a sign of drowsiness based on the number of face images from which the eye-closed state is detected. The travel controller 8 and the drowsiness sign notification device 9 may be implemented in the same ECU.

The communication interface 91, which is an example of a communication unit, includes a communication interface circuit for connecting the drowsiness sign notification device 9 to the in-vehicle network. The communication interface 91 provides data received, for example, from the driver monitoring camera 2 to the processor 93, and outputs data provided from the processor 93, for example, to the meter display 3.

The memory 92 includes volatile and nonvolatile semiconductor memories. The memory 92 stores various types of data used for processing by the processor 93, e.g., templates representing pupils and corneal reflection images of a light source. These templates are used for detecting the driver's eye-closed state from face images. The memory 92 also stores first and second periods for identifying the times of generation of face images subjected to determination as well as first and second thresholds for detecting the presence or absence of a sign of drowsiness, based on the ratio between the numbers of face images.

The memory 92 also stores various application programs, e.g., a computer program for notification of a sign of drowsiness causing the drowsiness sign notification device 9 to execute a method for notification of a sign of drowsiness.

The processor 93, which is an example of a control unit, includes one or more processors and a peripheral circuit thereof. The processor 93 may further include another operating circuit, such as a logic-arithmetic unit, an arithmetic unit, or a graphics processing unit.

Figure 3:
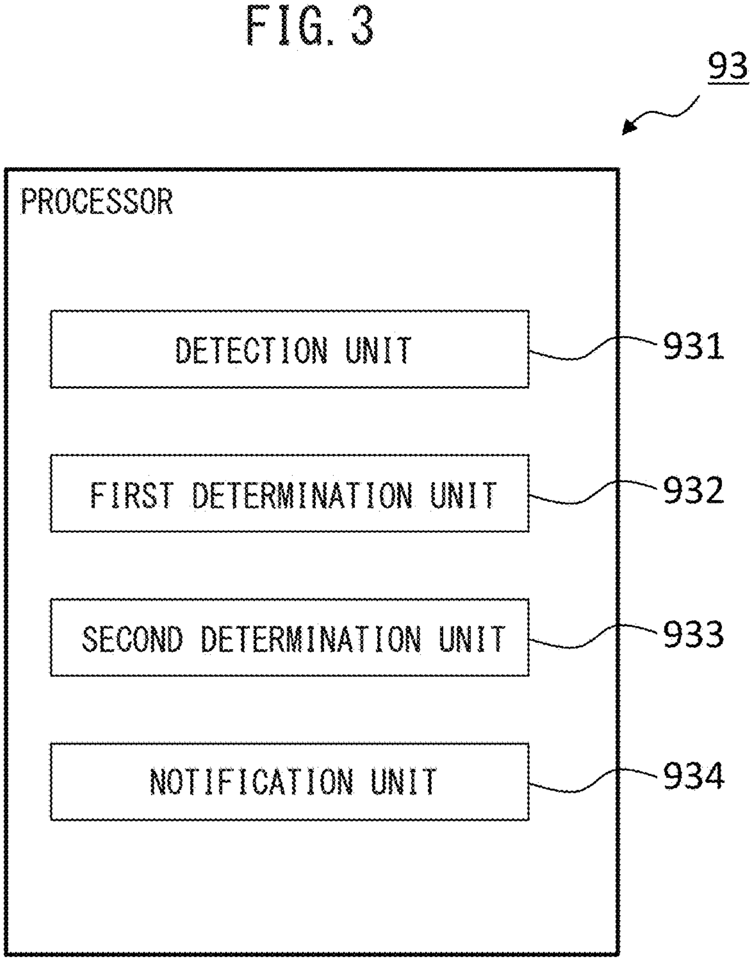
FIG. 3 is a functional block diagram of a processor included in the drowsiness sign notification device.

FIG. 3 is a functional block diagram of the processor 93 included in the drowsiness sign notification device 9.

As its functional blocks, the processor 93 of the drowsiness sign notification device 9 includes a detection unit 931, a first determination unit 932, a second determination unit 933, and a notification unit 934. These units included in the processor 93 are functional modules implemented by a program executed by the processor 93. The computer program for achieving the functions of the units of the processor 93 may be provided in a form recorded on a non-transitory computer-readable portable storage medium, such as a semiconductor memory, a magnetic medium, or an optical medium. Alternatively, the units included in the processor 93 may be implemented in the drowsiness sign notification device 9 as separate integrated circuits, microprocessors, or firmware.

The detection unit 931 detects the driver's eye-closed state from each of face images generated by the driver monitoring camera 2 at predetermined intervals.

The detection unit 931 inputs a face image into a classifier that detects a face region corresponding to a driver's face from a face image, thereby detecting a face region. In addition, the detection unit 931 identifies an eye region assumed to represent the driver's eyes in the face region, based on facial structure. The detection unit 931 then identifies the positions of the upper and lower eyelids by template matching of the identified eye region with templates representing upper and lower eyelids, and determines the distance between the upper and lower eyelids.

When the distance between the upper and lower eyelids determined from a face image does not exceed a predetermined distance threshold, the detection unit 931 detects an eye-closed state and stores the time of generation of the face image in the memory 92 in association with eye closure data indicating an eye-closed state (e.g., "2"). When the distance between the upper and lower eyelids determined from a face image exceeds the predetermined distance threshold, the detection unit 931 detects an eye-opened state and stores the time of generation of the face image in the memory 92 in association with eye openness data indicating an eye-opened state (e.g., "1"). When no face region is detected from a face image, no eye region is identified in a face region, or the positions of the upper and lower eyelids are not identified in an eye region, the detection unit 931 stores the time of generation of the face image in the memory 92 in association with failure data indicating failure of determination (e.g., "0").

The first determination unit 932 determines whether a first eye closure ratio that is the ratio of the number of face images from which the eye-closed state is detected to the number of face images generated in a first period exceeds a first threshold.

The second determination unit 933 determines whether a second eye closure ratio that is the ratio of the number of face images from which the eye-closed state is detected to the number of face images generated in a second period longer than the first period exceeds a second threshold less than or equal to the first threshold after determination that the first eye closure ratio does not exceed the first threshold.

Figure 4:
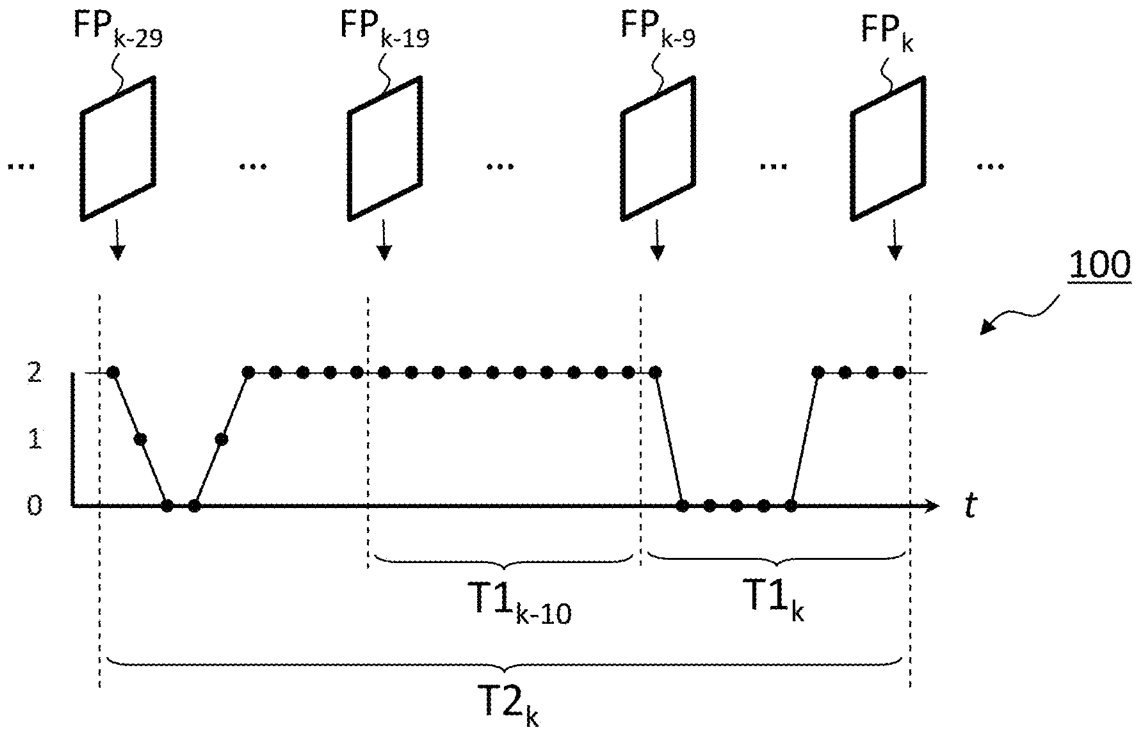
FIG. 4 illustrates an example of transition between eye-opened and eye-closed states.

FIG. 4 illustrates an example of transition between eye-opened and eye-closed states.

An eye-opened/closed state graph 100 represents transition between eye-opened and eye-closed states detected from time-series face images $FP_{k-29}$ to $FP_k$ generated by the driver monitoring camera 2 at times k−29 to k, respectively. In the eye-opened/closed state graph 100, the ordinate represents eye-opened and eye-closed states (2 is eye closure, 1 is eye openness, and 0 is failure), and the abscissa represents time. In the example of FIG. 4, the face images are generated at 1-second intervals. More specifically, face image $FP_{k-29}$ is generated 30 seconds earlier than face image $FP_k$.

In the example of FIG. 4, the first period is 10 seconds to a reference time. An eye-closed state is detected from ten of ten face images $FP_{k-19}$ to $FP_{k-10}$ generated in first period $T\mathbf{1}_{k-10}$ to time k−10. Thus the first determination unit 932 determines a first eye closure ratio corresponding to first period $T\mathbf{1}_{k-10}$ to time k−10 as 10/10=1.0. The first period may differ from 10 seconds and may be, for example, 8 or 12 seconds.

In the example of FIG. 4, the first threshold is 0.6. Thus the first determination unit 932 determines that the first eye closure ratio corresponding to time k−10 exceeds the first threshold. The first threshold may differ from 0.6 and may be, for example, 0.5 or 0.7.

Of ten face images $FP_{k-9}$ to $FP_k$ generated in first period $T\mathbf{1}_k$ to time k, which is 10 seconds (corresponding to the first period) later than time k−10, an eye-closed state is detected from five, and neither state can be determined from five. Thus the first determination unit 932 determines that a first eye closure ratio corresponding to first period $T\mathbf{1}_k$ to time k is 5/10=0.5 and does not exceed the first threshold.

After determination that the first eye closure ratio corresponding to first period $T\mathbf{1}_k$ to time k does not exceed the first threshold, the second determination unit 933 determines whether a second eye closure ratio corresponding to second period $T\mathbf{2}_k$ to time k exceeds the second threshold.

In the example of FIG. 4, the second period is 30 seconds to a reference time. Of thirty face images $FP_{k-29}$ to $FP_k$ generated in second period T2 to time k, an eye-closed state is detected from twenty-one, an eye-opened state is detected from two, and neither state can be determined from seven. Thus the second determination unit 933 determines the second eye closure ratio corresponding to second period $T\mathbf{2}_k$ to time k as 21/30=0.7.

The second period may differ from 30 seconds and may be, for example 25 or 35 seconds. The reference time of the second period may differ from that of the first period, and may be, for example, the end time of determination regarding the first period.

The second determination unit 933 may modify the length of the second period, depending on the level of autonomous driving at the reference time. For example, the second determination unit 933 obtains the level of autonomous driving at which travel of the vehicle 1 is controlled from the travel controller 8. When the travel controller 8 and the drowsiness sign notification device 9 are implemented in different ECUs, the second determination unit 933 inquires of the travel controller 8 about the level of autonomous driving via the communication interface 91. When the travel controller 8 and the drowsiness sign notification device 9 are implemented in the same ECU, the second determination unit 933 reads out the level of autonomous driving used for controlling travel of the vehicle 1, which is recorded in a predetermined area in the memory 92. The second determination unit 933 then sets the second period longer (e.g., to 60 seconds) when the level of autonomous driving does not require the driver to be alert to the surroundings of the vehicle than when the level of autonomous driving requires the driver to be alert to the surroundings of the vehicle. This enables the drowsiness sign notification device 9 to prevent interruption of notification caused by failure of determination resulting from a change in the driver's posture, which is likely to occur when travel is controlled at a level of autonomous driving that does not require the driver to be alert.

The second determination unit 933 may modify the length of the second period, depending on the amount of extraneous light. For example, the second determination unit 933 receives a light intensity signal indicating the amount of extraneous light entering the interior of the vehicle 1 from outside the vehicle 1, from the optical sensor 5 via the communication interface 91. The second determination unit 933 sets the second period longer (e.g., to 60 seconds) when the amount of extraneous light indicated by the received light intensity signal exceeds an extraneous light intensity threshold stored in the memory 92 than when the amount of the extraneous light does not exceed the extraneous light intensity threshold. This enables the drowsiness sign notification device 9 to prevent interruption of notification caused by failure of determination resulting from intense extraneous light.

In the example of FIG. 4, the second threshold is 0.6, which is equal to the first threshold. Thus the second determination unit 933 determines that the second eye closure ratio corresponding to time k exceeds the second threshold.

The second determination unit 933 may set the second threshold to a value less than the first threshold (e.g., to 0.5 less than the first threshold, which is 0.6). This enables the drowsiness sign notification device 9 to prevent interruption of notification caused by failure of determination more appropriately.

For example, the second determination unit 933 may set the second threshold lower when the level of autonomous driving does not require the driver to be alert to the surroundings of the vehicle than when the level of autonomous driving requires the driver to be alert. This enables the drowsiness sign notification device 9 to prevent interruption of notification caused by failure of determination resulting from a change in the driver's posture or a gaze in a direction other than a travel direction (e.g., upon a car navigation device), which is likely to occur when travel is controlled at a level of autonomous driving that does not require the driver to be alert to the surroundings of the vehicle.

The second determination unit 933 may set the second threshold lower when the vehicle 1 is manually driven based on the driver's operation than when the vehicle is autonomously driven. This enables the drowsiness sign notification device 9 to prevent interruption of notification caused by failure of determination resulting from looking in a direction other than a travel direction, which is likely to occur during manual driving.

The second determination unit 933 may set the second threshold lower when the driver wears eyeglasses or sunglasses than when the driver does not wear eyeglasses or sunglasses. This enables the drowsiness sign notification device 9 to prevent interruption of notification caused by failure of determination resulting from overlap between the frames of eyeglasses or sunglasses and the eyes. Whether the driver wears eyeglasses or sunglasses can be detected, for example, by the detection unit 931 executing template matching of an eye region with templates representing frames of eyeglasses or sunglasses.

Referring back to FIG. 3, the notification unit 934 notifies detection of a sign of drowsiness to the driver when it is determined that the first eye closure ratio exceeds the first threshold or that the second eye closure ratio exceeds the second threshold. The notification unit 934 transmits a display signal for displaying a screen for notifying detection of a sign of drowsiness to the driver to the meter display 3 via the communication interface 91. The screen for notifying detection of a sign of drowsiness to the driver may include a text string meaning detection of a sign of drowsiness, such as "A sign of drowsiness is shown," a text string such as "Have a break?," or information for advising the driver to have a break, such as an image indicating a coffee break. As notification of detection of a sign of drowsiness to the driver, the notification unit 934 may cause a speaker (not illustrated) to output a predetermined voice or sound (e.g., a beep), in addition to displaying a screen on the meter display 3.

Figure 5:
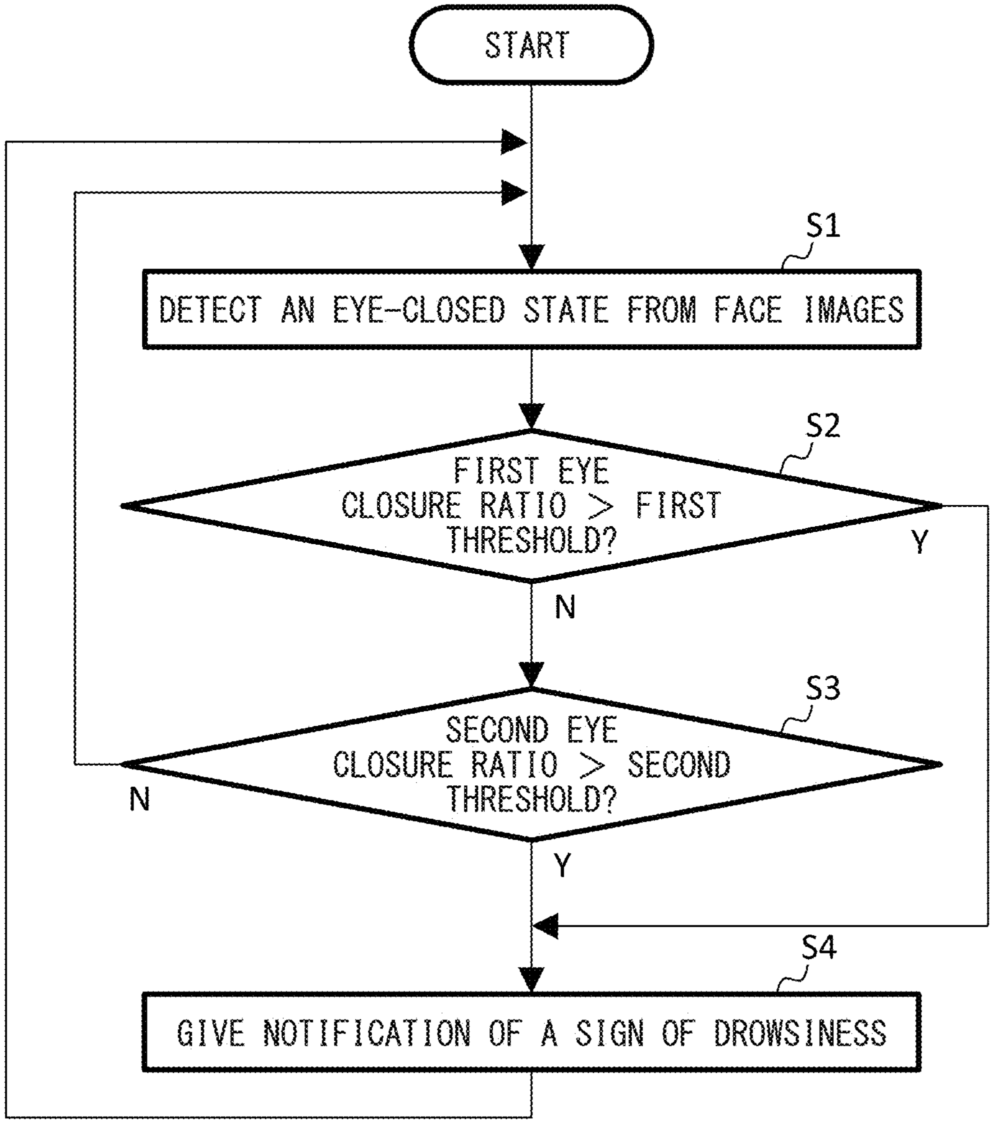
FIG. 5 is a flowchart of a drowsiness sign notification process.

FIG. 5 is a flowchart of a drowsiness sign notification process. The processor 93 of the drowsiness sign notification device 9 executes the drowsiness sign notification process described below at predetermined intervals (e.g., at 1-second intervals) during travel of the vehicle 1.

First, the detection unit 931 of the processor 93 of the drowsiness sign notification device 9 detects the driver's eye-closed state from face images obtained from the driver monitoring camera 2 (step S1). In step S1, the detection unit 931 detects the driver's eye-closed state from each of face images generated in a first period based on a predetermined time.

Subsequently, the first determination unit 932 of the processor 93 determines whether a first eye closure ratio that is the ratio of the number of face images from which the eye-closed state is detected to the number of face images generated in the first period exceeds a first threshold (step S2). When it is determined that the first eye closure ratio exceeds the first threshold (Yes in step S2), the process of the processor 93 proceeds to step S4 described below.

When it is determined that the first eye closure ratio does not exceed the first threshold (No in step S2), the second determination unit 933 of the processor 93 determines whether a second eye closure ratio that is the ratio of the number of face images from which the eye-closed state is detected to the number of face images generated in a second period longer than the first period exceeds a second threshold (step S3). When it is determined that the second eye closure ratio does not exceed the second threshold (No in step S3), the processor 93 returns the process to step S1 and executes the processing of step S1 and the subsequent steps regarding a first period based on the time later than the predetermined time in the last step S1 by the length of the first period.

When it is determined that the second eye closure ratio exceeds the second threshold (Yes in step S3), the notification unit 934 of the processor 93 notifies detection of a sign of drowsiness to the driver (step S4). After execution of step S4, the processor 93 returns the process to step S1 and executes the processing of step S1 and the subsequent steps regarding a first period based on the time later than the predetermined time in the last step S1 by the length of the first period.

By executing the drowsiness sign notification process in this way, the drowsiness sign notification device 9 can notify a sign of drowsiness to a driver of a vehicle appropriately.

It should be noted that those skilled in the art can make various changes, substitutions, and modifications without departing from the spirit and scope of the present disclosure.

What is claimed is:

1. A drowsiness sign notification device comprising a processor configured to:

detect an eye-closed state of a driver of a vehicle from each of face images representing a face region of the driver and generated at different times;

determine whether a first eye closure ratio that is the ratio of the number of face images from which the eye-closed state is detected to the number of the face images generated in a first period exceeds a first threshold;

determine whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notify detection of a sign of drowsiness to the driver via notification equipment provided in the vehicle, when it is determined that the first eye closure ratio exceeds the first threshold or that the second eye closure ratio exceeds the second threshold, wherein in determination whether the second eye closure ratio exceeds the second threshold, the processor sets the second period longer when a level of autonomous driving executed by a travel controller provided in the vehicle to control travel of the vehicle does not require the driver to be alert to surroundings of the vehicle than when the level of the autonomous driving requires the driver to be alert to the surroundings of the vehicle.

2. The drowsiness sign notification device according to claim 1, wherein in determination whether the second eye closure ratio exceeds the second threshold, the processor sets the second period longer when an amount of extraneous light entering an interior of the vehicle from outside the vehicle sensed by a light intensity sensor provided in the vehicle exceeds an extraneous light intensity threshold than when the amount of the extraneous light does not exceed the extraneous light intensity threshold.

3. The drowsiness sign notification device according to claim 1, wherein the processor sets the second threshold less than the first threshold in determination whether the second eye closure ratio exceeds the second threshold.

4. The drowsiness sign notification device according to claim 3, wherein in determination whether the second eye closure ratio exceeds the second threshold, the processor sets the second threshold lower when a level of autonomous driving executed by a travel controller provided in the vehicle to control travel of the vehicle does not require the driver to be alert to surroundings of the vehicle than when the level of the autonomous driving requires the driver to be alert to the surroundings of the vehicle.

5. A method for notification of a sign of drowsiness executed by a drowsiness sign notification device configured to notify detection of a sign of drowsiness to a driver of a vehicle, the method comprising:

detecting an eye-closed state of the driver from each of face images representing a face region of the driver and generated at different times;

determining whether a first eye closure ratio that is the ratio of the number of face images from which the eye-closed state is detected to the number of the face images generated in a first period exceeds a first threshold;

determining whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notifying detection of a sign of drowsiness to the driver via notification equipment provided in the vehicle, when it is determined that the first eye closure ratio exceeds the first threshold or that the second eye closure ratio exceeds the second threshold, wherein in determination whether the second eye closure ratio exceeds the second threshold, setting the second period longer when a level of autonomous driving executed by a travel controller provided in the vehicle to control travel of the vehicle does not require the driver to be alert to surroundings of the vehicle than when the level of the autonomous driving requires the driver to be alert to the surroundings of the vehicle.

6. A non-transitory computer-readable medium storing a computer program for notification of a sign of drowsiness, the computer program causing a computer to execute a process comprising:

detecting an eye-closed state of a driver of a vehicle from each of face images representing a face region of the driver and generated at different times;

determining whether a first eye closure ratio that is the ratio of the number of face images from which the eye-closed state is detected to the number of the face images generated in a first period exceeds a first threshold;

determining whether a second eye closure ratio that is the ratio of the number of face images from which the eye-closed state is detected to the number of the face images generated in a second period longer than the first period exceeds a second threshold less than or equal to the first threshold after determination that the first eye closure ratio does not exceed the first threshold; and notifying detection of a sign of drowsiness to the driver via notification equipment provided in the vehicle, when it is determined that the first eye closure ratio exceeds the first threshold or that the second eye closure ratio exceeds the second threshold, wherein in determination whether the second eye closure ratio exceeds the second threshold, setting the second period longer when a level of autonomous driving executed by a travel controller provided in the vehicle to control travel of the vehicle does not require the driver to be alert to surroundings of the vehicle than when the level of the autonomous driving requires the driver to be alert to the surroundings of the vehicle.

* * * * *